(12) United States Patent
Teng

(10) Patent No.: US 8,282,108 B2
(45) Date of Patent: Oct. 9, 2012

(54) WATER LEAKAGE-PROOF APPARATUS

(75) Inventor: Chung-Hsien Teng, Hsinchu County (TW)

(73) Assignee: Unisaf Enterprise Company Limited, Hsinchu County (TW)

( * ) Notice: Subject to any disclaimer, the term of this patent is extended or adjusted under 35 U.S.C. 154(b) by 348 days.

(21) Appl. No.: 12/727,479

(22) Filed: Mar. 19, 2010

(65) Prior Publication Data

US 2011/0227298 A1    Sep. 22, 2011

(51) Int. Cl.
*F16L 5/02* (2006.01)
(52) U.S. Cl. ............................ 277/605; 277/645
(58) Field of Classification Search ............ 277/602, 277/605, 609, 616, 627, 628, 630, 637, 645
See application file for complete search history.

(56) References Cited

U.S. PATENT DOCUMENTS

| | | | | |
|---|---|---|---|---|
| 1,975,886 A * | 10/1934 | Wheeler | ................ | 277/317 |
| 2,307,346 A * | 1/1943 | Allen | ................ | 277/512 |
| 4,136,707 A * | 1/1979 | Gaillot et al. | ................ | 137/75 |
| 4,540,184 A * | 9/1985 | Takahashi et al. | ................ | 277/606 |
| 4,646,486 A * | 3/1987 | Hauff | ................ | 52/1 |
| 5,156,509 A | 10/1992 | Wu | | |
| 5,257,641 A * | 11/1993 | Elsbury et al. | ................ | 137/79 |
| 6,003,873 A * | 12/1999 | Solberg | ................ | 277/323 |
| 6,176,052 B1 * | 1/2001 | Takahashi | ................ | 52/232 |
| 7,712,791 B1 * | 5/2010 | Whitehead | ................ | 285/215 |
| 2009/0104000 A1 | 4/2009 | Miyoshi et al. | | |

* cited by examiner

*Primary Examiner* — Vishal Patel
(74) *Attorney, Agent, or Firm* — Muncy, Geissler, Olds & Lowe, PLLC

(57) ABSTRACT

A water leakage-proof apparatus aims to be firmly held between a shaft and a fixed surface to maintain water leakage-proof effect of the fixed surface and the surrounding of the shaft to prevent external water from flowing along the shaft into chinks around the shaft to form water leakage. The water leakage-proof apparatus includes a casing which has an orifice and an opening at one side. The water leakage-proof apparatus is coupled on the shaft through the orifice so that the opening covers the fixed surface. The water leakage-proof apparatus holds waterproof powder inside to achieve water leakage-proof effect.

6 Claims, 9 Drawing Sheets

WATER LEAKAGE-PROOF APPARATUS

FIELD OF THE INVENTION

The present invention relates to a water leakage-proof apparatus and particularly to a water leakage-proof apparatus that employs waterproof powder.

BACKGROUND OF THE INVENTION

Roofing waterproof engineering always is an important and challenging task needed to be improved. Building floor or cement floor inflicted water leakage mostly caused by cracks of floor, hence external water permeates through the cracks and flows indoors, and results in water leakage and efflorescence. On rooftop floor, cracks could be formed naturally, such as due to weathering for a long period of time, or drastic external climate changes, and cold and hot temperature differences that create chinks. Other external impacts such as earthquake and natural disasters also could produce cracks and chinks of varying sizes.

Due to different objectives, a wide variety of facilities or structures could be installed on building floors, such as solar panels and standpipes on the rooftop, huge commercial billboards and signboards on the building, etc. Installing those external facilities or structures often have to drilling bores on the floor, and fastening bolts or screws in the bores to mount base frames of the external facilities or structures thereon, then fastened with nuts. Drilling the bores through the floor or merely at a selected depth without running through the floor, and thrusting the screws in the bores tend to create small cracks and chinks and cause water leakage of the floor.

In the conventional techniques, after the bolt or screw has been disposed in the drilled hole, waterproof sealant is applied around the drilled hole to overcome water leakage problem. However, the waterproof sealant has limited durability, and often loses its efficacy due to degradation caused by sun shining. It also needs periodical maintenance. Moreover, adhesion between the waterproof sealant and floor often is not desirable. Water easily permeates through the interface between them and water leakage problem is not fully solved. Another approach is to install waterproof washers or O-ring on the nut or screw to prevent water from permeating through the gap formed between the bolt and bore after fastening the nut or screw. Reference can be found in U.S. Pat. No. 5,156,509 entitled "Waterproof screw fastener" and U.S. publication No. 2009/0104000 entitled "Waterproof structure for portion where members are tightened with screw". But they all provide a limited waterproof scope without covering an extensive area surrounding the drilled bore.

SUMMARY OF THE INVENTION

Therefore, the primary object of the present invention is to solve the aforesaid problem by providing a water leakage-proof apparatus to be firmly mounted between a screw bar and a floor to prevent external water from permeating into the chinks around the screw bar and result in water leakage.

To achieve the foregoing object, the water leakage-proof apparatus according to the invention is coupled on a shaft perpendicular to a fixed surface. The water leakage-proof apparatus includes a casing and a movable isolating structure. The casing has an orifice and an opening at one side. The casing also has a powder holding chamber opposing the opening. The movable isolating structure is located between the powder holding chamber and the opening, such that waterproof powder is held and retained in the powder holding chamber. The water leakage-proof apparatus is coupled on the shaft through the orifice, such that the opening can cover the fixed surface. The movable isolating structure can be opened to dispense the waterproof powder onto the fixed surface from the powder holding chamber.

In another embodiment, the water leakage-proof apparatus includes a casing which has an orifice and an opening at one side. The water leakage-proof apparatus is coupled on a shaft through the orifice, so that the opening can cover the fixed surface. The casing further has at least one powder injection hole sealed by a sealing element. The waterproof powder can fill the water leakage-proof apparatus through the powder injection hole and drop to cover the fixed surface.

In short, the water leakage-proof apparatus of the invention can cover the shaft and fixed surface with the waterproof powder which is hydrophobic to fend off external water or moisture from entering the covered area to achieve water leakage-proof effect.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

The present invention aims to provide a water leakage-proof apparatus to cover surrounding area of a screw bar, bolt or screw that sinks in or runs through a wall with waterproof powder to provide waterproof effect. The invention also provides various types of embodiments on the waterproof powder and water leakage-proof apparatus as follow:

Waterproof Powder:

The powder used in the invention is hydrophobic waterproof powder which has specific gravity (density) higher than pure water and is insolvable in the water, thus can prevent sweat or moisture from running through the powder layer from upper side. The powder is a natural powder or a ground and eco-friendly recycled and regenerated powder. It has eco-friendly characteristics such as incombustible, corrosion-resistant, non-toxic and odor-free, and also does not being degraded and deteriorated due to weathering and climate changes, thus can stably maintain waterproof and humidity resistant state in a prolonged duration.

In one embodiment set forth above, the powder is a white powder consisting of calcium carbonate, Kaolin clay, quartz and the like that is obtained from natural ores and formed by grinding. It is treated with modification of organic surfactant or surface treatment to make the surface of the powder to form hydrophobic groups. Test results show that the waterproof powder has density between 2.6~2.73 (g/cm$^3$), heat conductivity coefficient smaller than 0.07 (W/m·k), and does not contain heavy metal and other toxic materials such as silver, copper, asbestos, hexavalent chromium or the like. As the waterproof powder is obtained from the nature, no environmental pollution occurs. Moreover, it is not chemical synthesis material, hence does not have aging, deterioration and degradation problems. It is to be noted that the waterproof powder made from different materials or production processes might have different characteristics in some degrees. The specifications discussed in the embodiment merely serve for illustrative purpose and are not the limitations of the invention. The term of "waterproof powder" hereinafter is a general term for the hydrophobic powder.

Embodiment 1

Embodiment 1 aims to discuss a water leakage-proof apparatus 10 in details. First, the water leakage-proof apparatus 10 can be coupled on a shaft such as a screw bar jutting from a wall or a floor, or a steel bar jutting from a wall, and the shaft can be a screw bar sinks in or runs through a wall, a bolt sinks in or runs through a wall, or a screw sinks in a wall, or a foundation bolt or an anchor bolt. In the specification of the invention, the wall means a fixed surface 1. The jutting shaft, whether it is a screw bar, bolt, or steel bar, is generally called a shaft 2. Thus the water leakage-proof apparatus 10 can be coupled on the shaft 2 perpendicular to the fixed surface 1 to prevent water from permeating through after the shaft 2 is mounted onto the fixed surface 1.

Figure 1A:
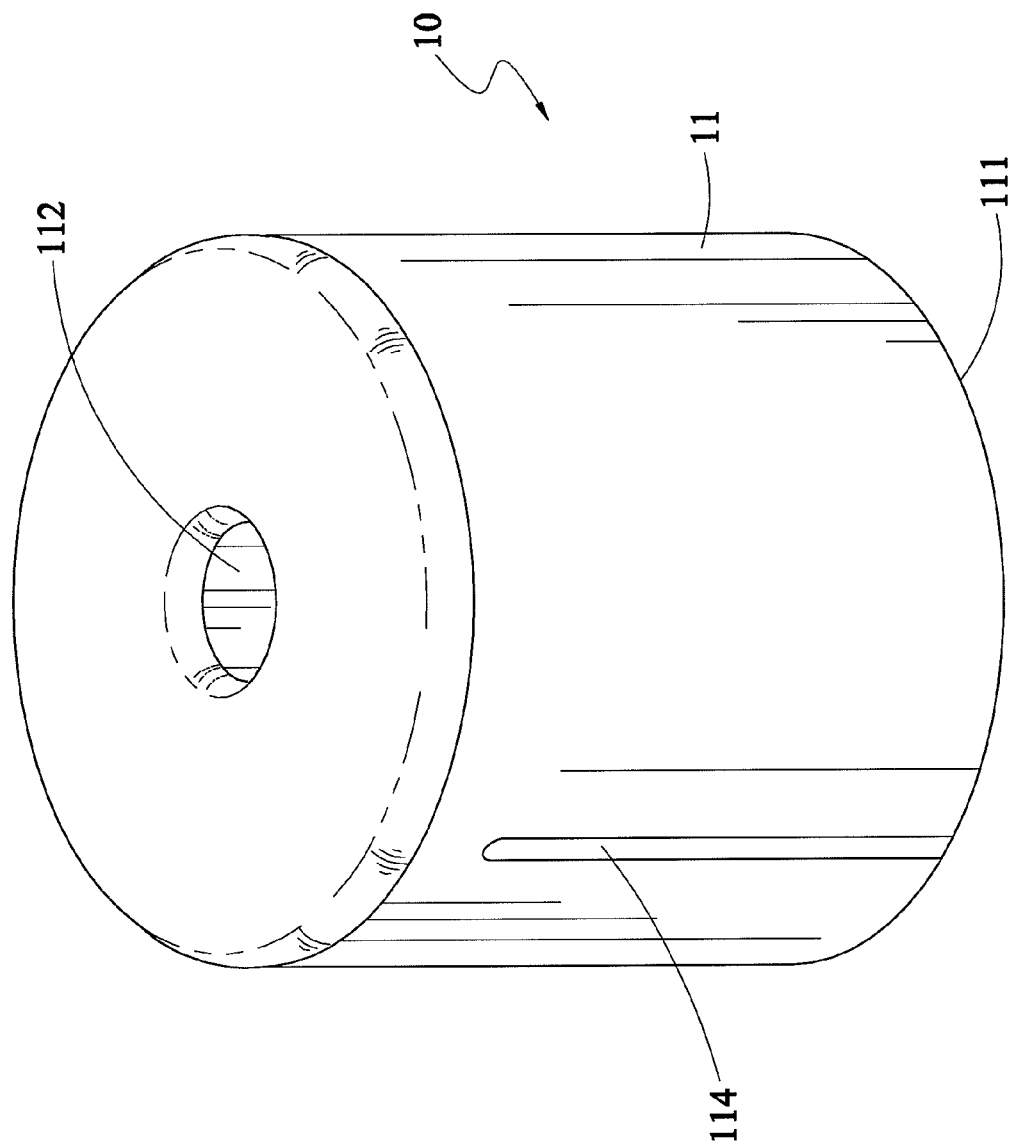
FIG. 1A is a perspective view of an embodiment of the water leakage-proof apparatus of the invention.
Figure 1B:
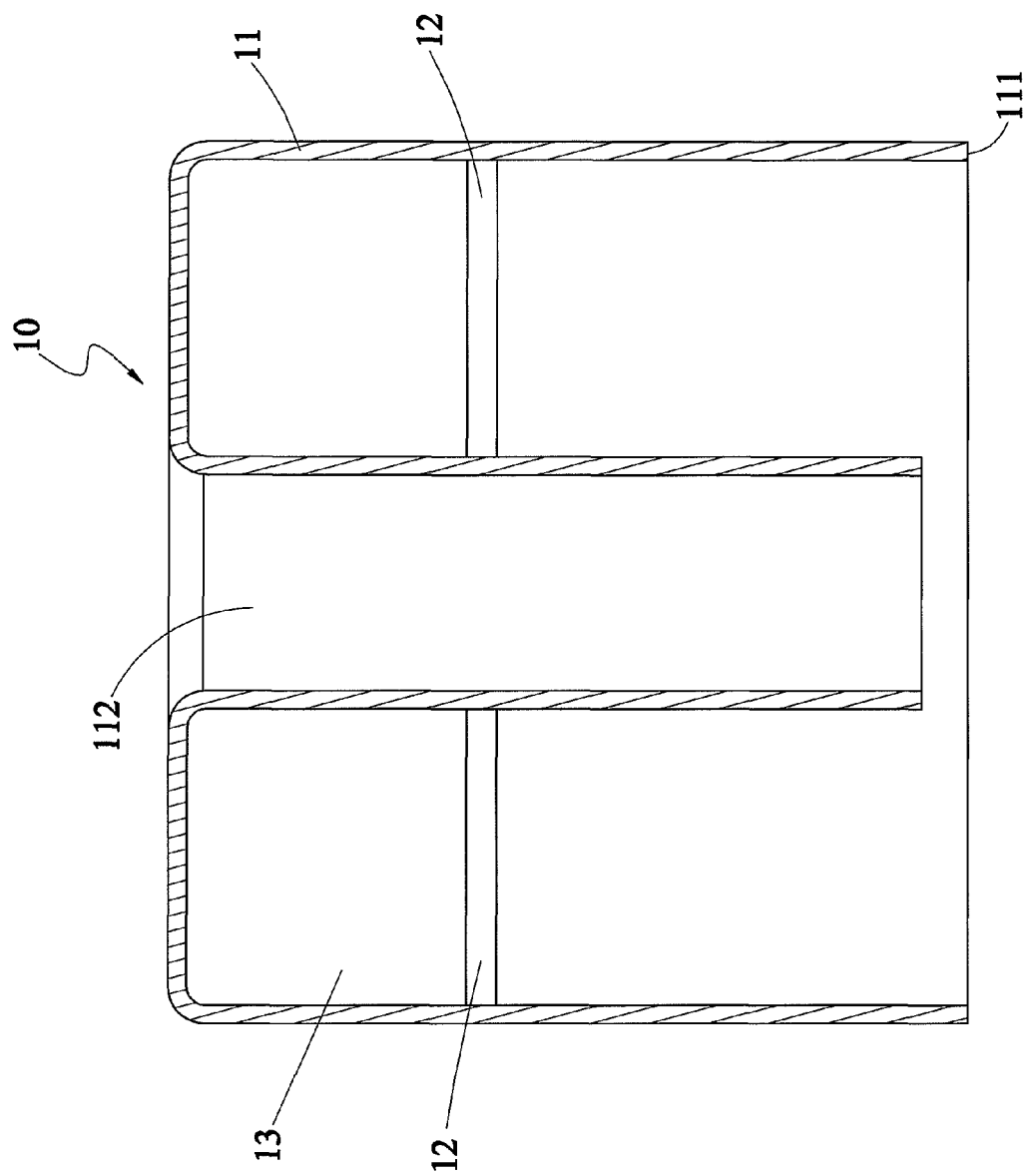
FIG. 1B is a cross-sectional view of an embodiment of the water leakage-proof apparatus of the invention.

Refer to FIGS. 1A and 1B for an embodiment of the water leakage-proof apparatus 10 of the invention. It comprises a casing 11 and a movable isolating structure 12. The casing 11 has one side sealed and an opposite side with an opening 111 formed thereon. The embodiment shown in FIG. 1A is a cylindrical water leakage-proof apparatus 10. The casing 11 has an orifice 112 formed in the axial direction. The opening 111 faces the fixed surface 1 (also referring to FIG. 2A). The orifice 112 is coupled on the shaft 2 perpendicular to the fixed surface 1 (also referring to FIG. 2A). The casing 11 forms a wall of the orifice 112 to provide support. The shaft 2 may be a screw bar. After the water leakage-proof apparatus 10 is coupled thereon, the frame or structure of other external facilities can be mounted thereon.

Figure 2A:
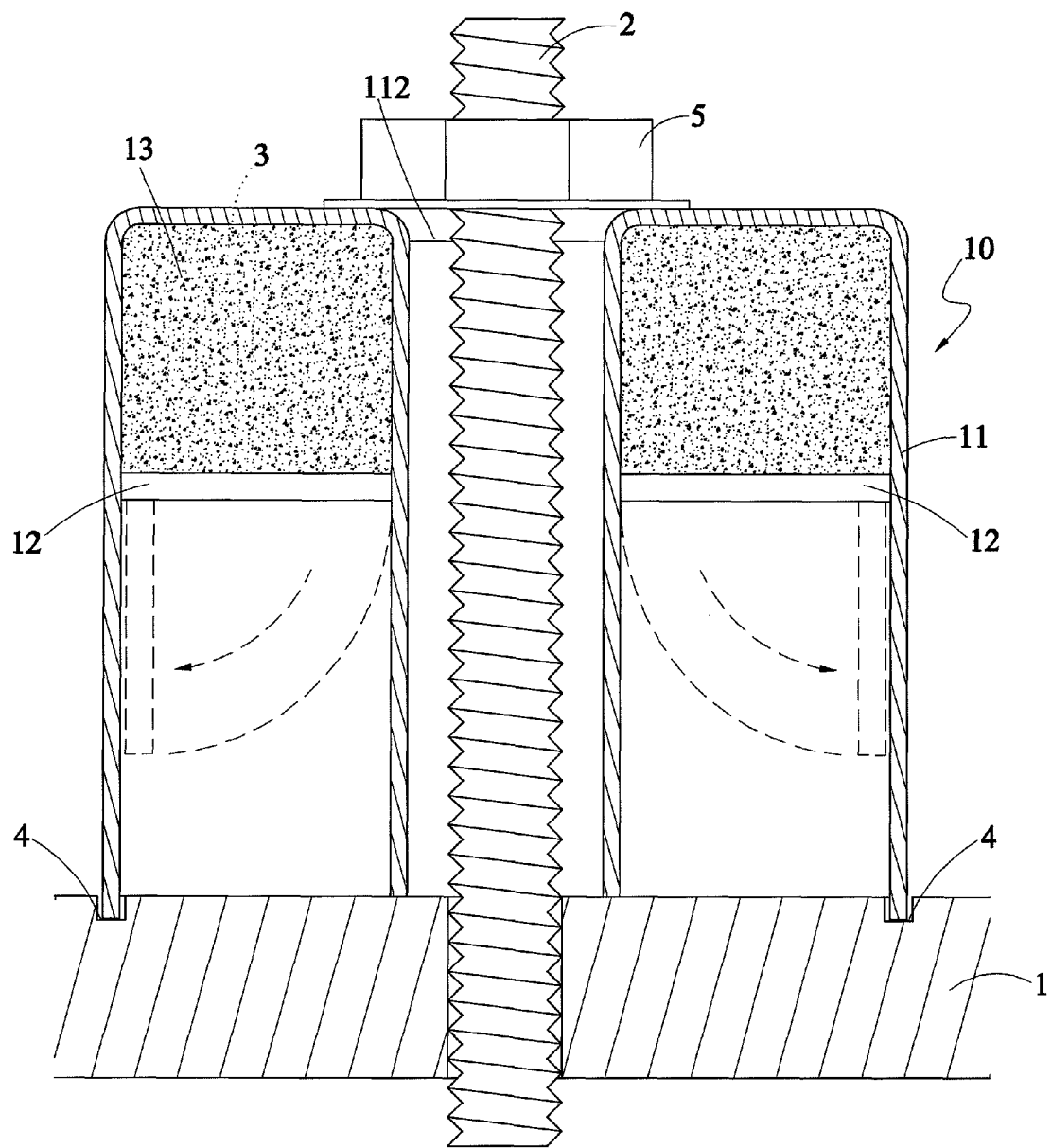
FIGS. 2A and 2B are schematic views of an embodiment of the water leakage-proof apparatus of the invention in use conditions.
Figure 2B:
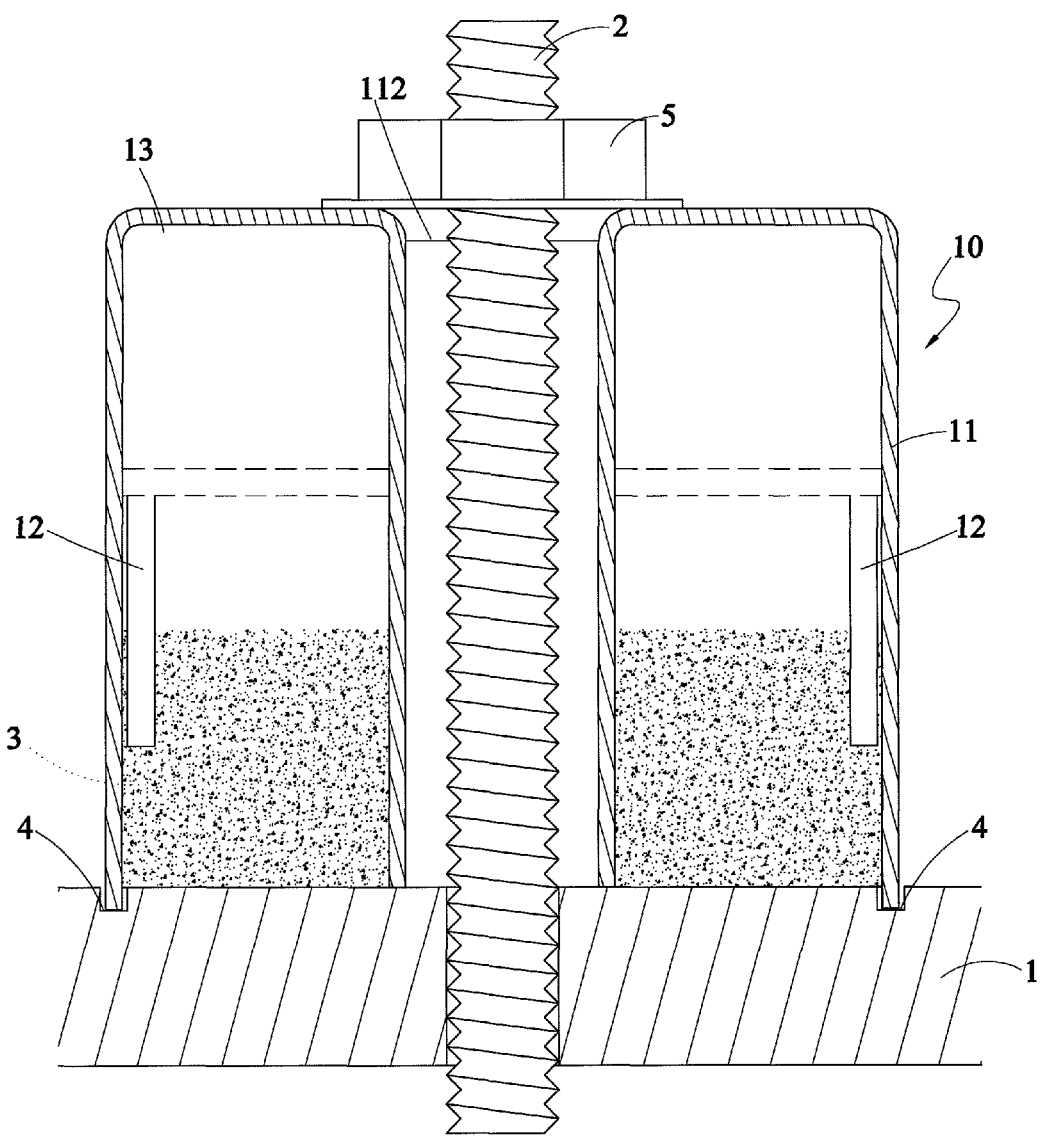

Referring to FIG. 2A, the casing 11 further has a powder holding chamber 13 at an inner side opposite to the opening 111. The movable isolating structure 12 is located in the casing 11 between the powder holding chamber 13 and the opening 111. The powder holding chamber 13 holds waterproof powder 3 which is blocked by the movable isolating structure 12 retained in the powder holding chamber 13. Referring to FIG. 2B, after the water leakage-proof apparatus 10 is coupled on the shaft 2 and fastened to the fixed surface 1 through a fastening element 5, the movable isolating structure 12 can be released to drop the waterproof powder 3 held in the powder holding chamber 13 onto the fixed surface 1 by gravity. The waterproof powder 3 forms a waterproof layer and stacks at the opening 111 side in the casing 11, thus can prevent external water from entering the area covered by the water leakage-proof apparatus 10.

It is to be noted that the "movable isolating structure 12" allows users to control and retain the waterproof powder 3 in the powder holding chamber 13 in a desired condition. Namely, when the water leakage-proof apparatus 10 is coupled on the fixed surface 1, the movable isolating structure 12 can retain the waterproof powder 3 in the powder holding chamber 13. After the water leakage-proof apparatus 10 is coupled on the fixed surface 1, the movable isolating structure 12 can be moved or deformed to drop the waterproof powder 3 from the powder holding chamber 13.

Figure 3:
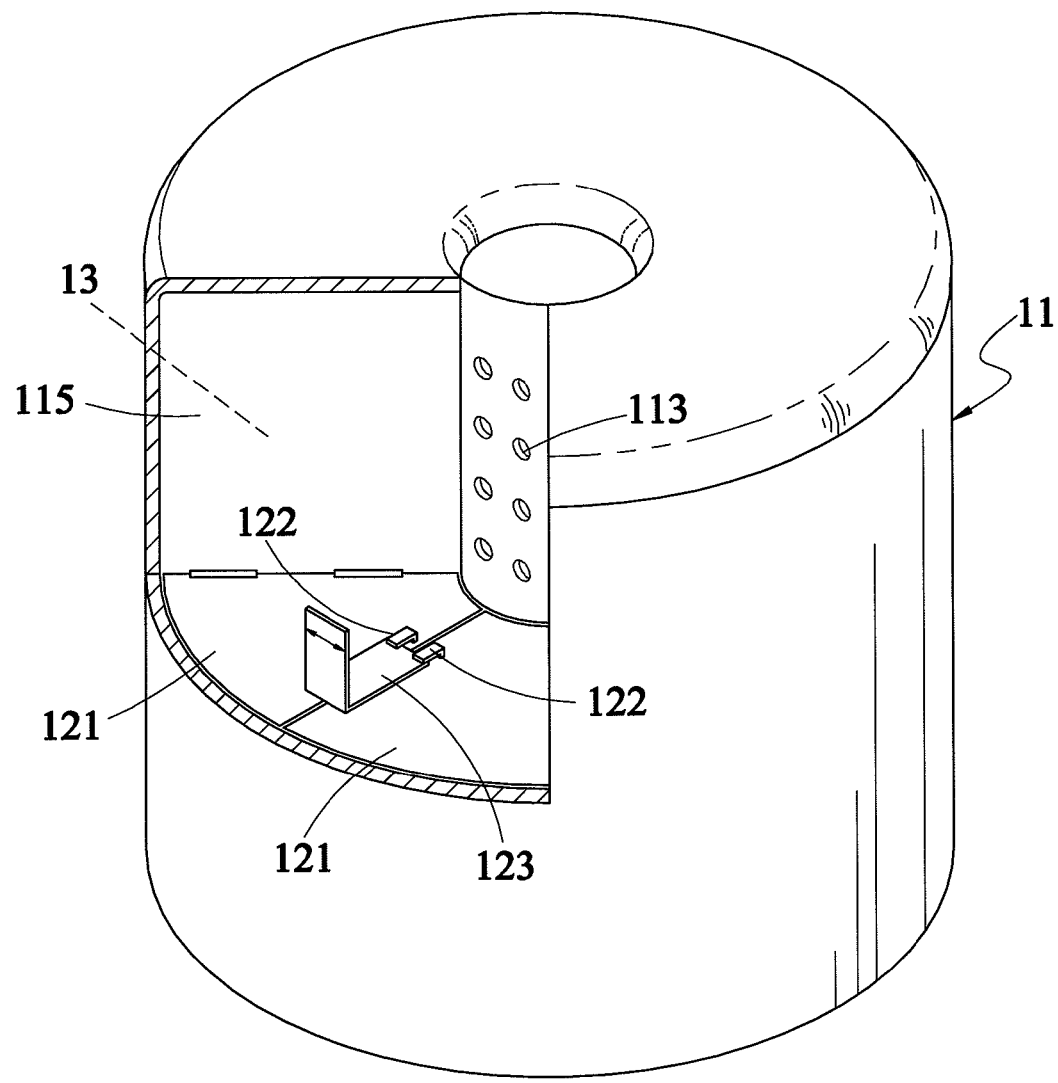
FIG. 3 is a schematic view of an embodiment of a movable isolating structure of the invention.

Please refer to FIG. 3 for an embodiment of the movable isolating structure 12. The powder holding chamber 13 is divided by a plurality of partitions 115, and each divided powder holding chamber 13 is corresponding to one movable isolating structure 12. Each movable isolating structure 12 includes a plurality of isolating plates 121. Each isolating plate 121 has a latch portion 122 corresponding to a latch element 123. The isolating plates 121 can be fastened to the latch portion 122 and maintained horizontally by latching the latch element 123 to keep the waterproof powder 3 in the powder holding chamber 13. When the latch element 123 is moved to escape from the latch portion 122, then the isolating plates 121 drop due to gravity so that the waterproof powder 3 can drop from the powder holding chamber 13 onto the fixed surface 1. The partitions 115 can be extended from the top of the casing 11 downwards to the opening 111 side in contact with the fixed surface 1 to provide support. It is to be noted that the embodiment of the movable isolating structure 12 previously discussed merely serves as an example. In practice, various embodiments can be formed in response to different structural designs and structures of the casing 11.

Figure 4A:
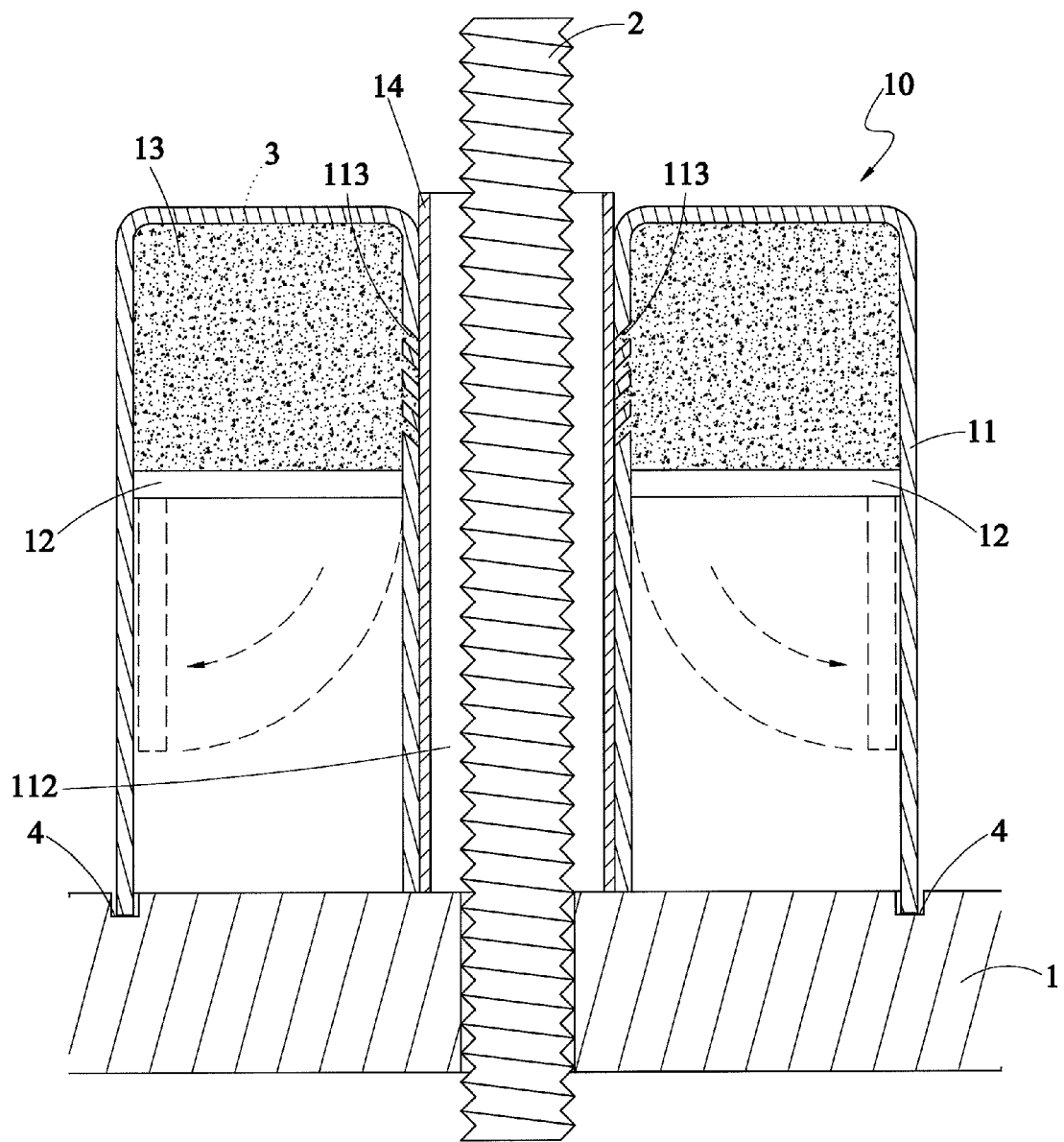
FIGS. 4A and 4B are schematic views of another embodiment of the water leakage-proof apparatus of the invention in use conditions.
Figure 4B:
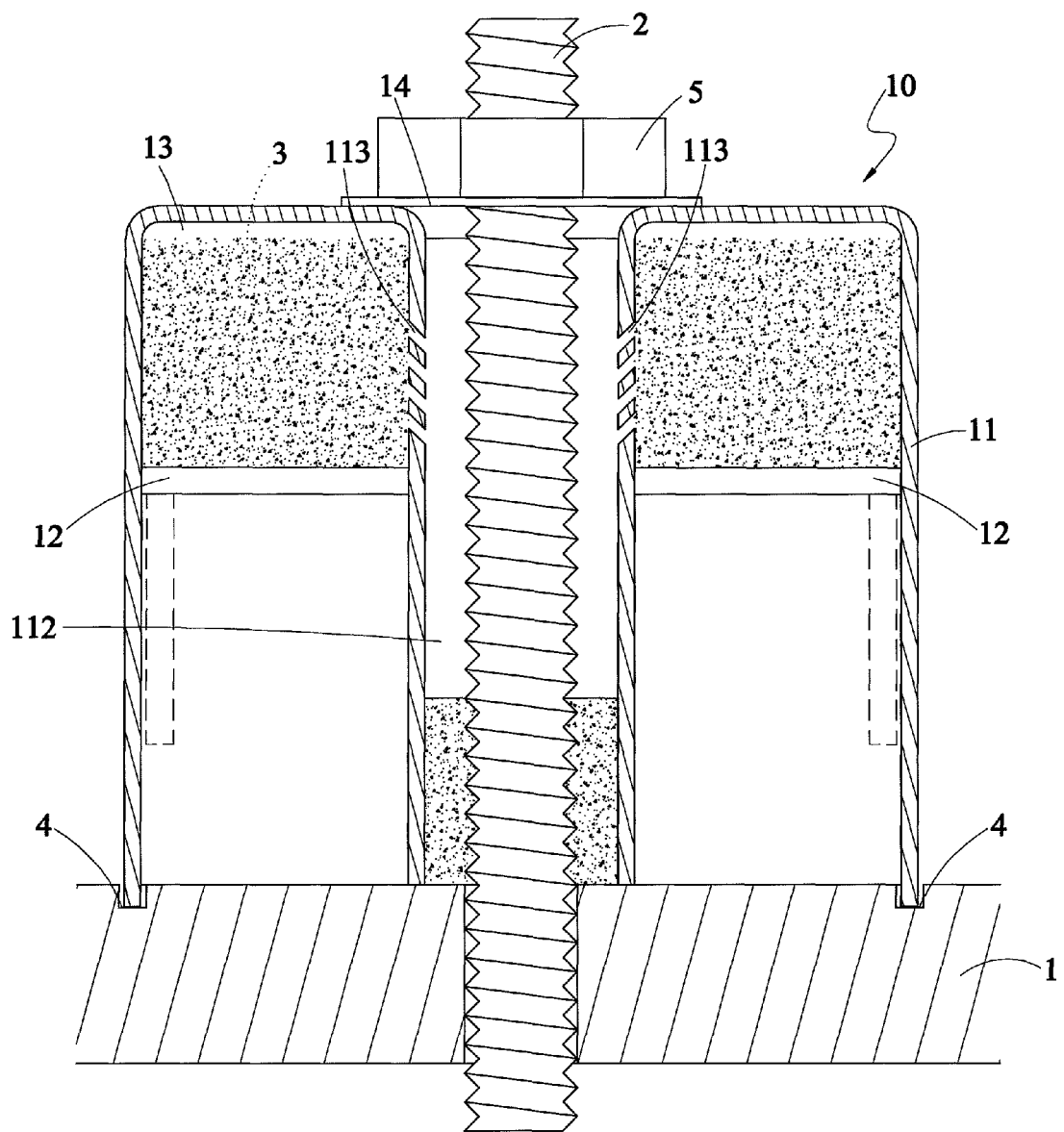

Please also refer to FIGS. 4A and 4B, in order to allow a portion of the waterproof powder 3 to drop on the area where the shaft 2 is coupled on the orifice 112, the water leakage-proof apparatus 10 has a plurality of powder release holes 113 communicating with the powder holding chamber 13 on a wall of the casing 11 to incorporate with a sleeve 14 when in use. The sleeve 14 has an inner diameter larger than the diameter of the shaft 2 and runs through the orifice 112 to prevent the waterproof powder 3 held in the powder holding chamber 13 from spilling out through the powder release holes 113 as shown in FIG. 4A. After the water leakage-proof apparatus 10 is coupled on the shaft 2 of the fixed surface 1, the sleeve 14 can be removed to allow a portion of the waterproof powder 3 to drop the area around the shaft 2 through the powder release holes 113 to form a waterproof layer as shown in FIG. 4B, then external water can be prevented from flowing along the shaft 2 to the fixed surface 1 to further enhance the protection effect of the water leakage-proof apparatus 10.

In addition, to facilitate installation of the water leakage-proof apparatus 10, the fixed surface 1 may have an anchor trough 4 formed thereon as shown in FIG. 2A at a size mating the opening 111 of the casing 11. The water leakage-proof apparatus 10 can be inserted into the anchor trough 4 through the opening 111 and be securely mounted onto the fixed surface 1. By wedging the side wall of the opening 111 of the casing 11 in the anchor trough 4, spill of the waterproof powder 3 held in the casing 11 can also be avoided to further improve water leakage-proof effect. On the other hand, the area of the fixed surface 1 covered by the water leakage-proof apparatus 10 mainly aims to provide water leakage-proof effect around the shaft 2, but this is not the limitation. In some other embodiments, the minimum covering area of the water leakage-proof apparatus 10 on the fixed surface 1 can be set about four times of the diameter of the shaft 2 or more.

In the embodiment set forth above, the casing 11 is made of a sturdy and rust-resistant material to firmly support an additional base of the shaft 2, such as rust-resistant metal, polyxymethylene (POM) or plastic, but this is not the limitation. On the other hand, in other embodiments, the casing 11 can include a window 114 in parallel with the shaft 2 to allow users to observe laying conditions of the waterproof powder 3 in the water leakage-proof apparatus 10.

Embodiment 2

Compared with the embodiment 1 previously discussed that uses the movable isolating structure 12 to drop the waterproof powder 3 onto the fixed surface 1, in embodiment 2, the waterproof powder 3 can be stuffed additionally in a water leakage-proof apparatus 20 to cover the fixed surface 1.

Figure 5A:
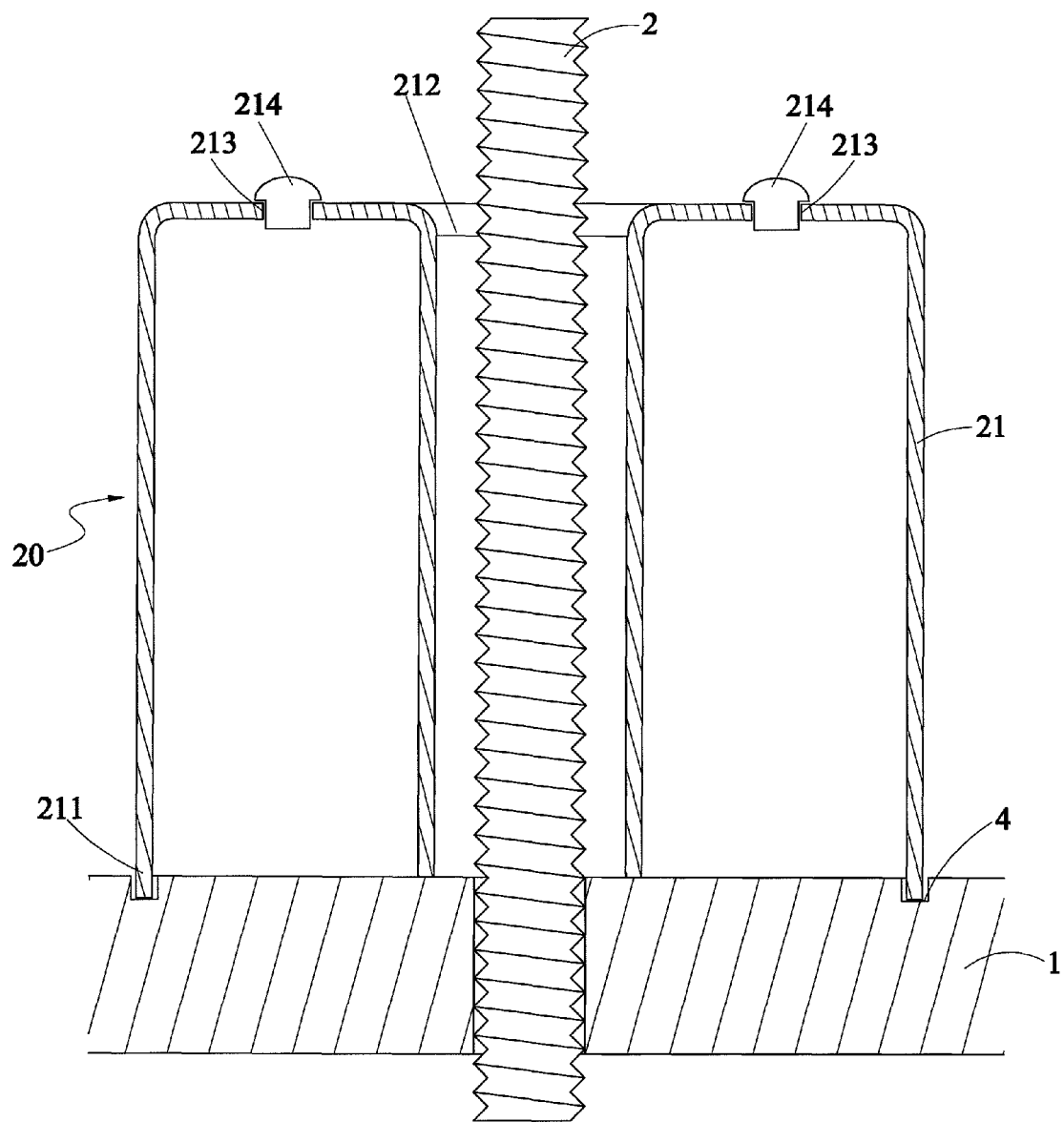
FIGS. 5A and 5B are schematic views of yet another embodiment of the water leakage-proof apparatus of the invention in use conditions.
Figure 5B:
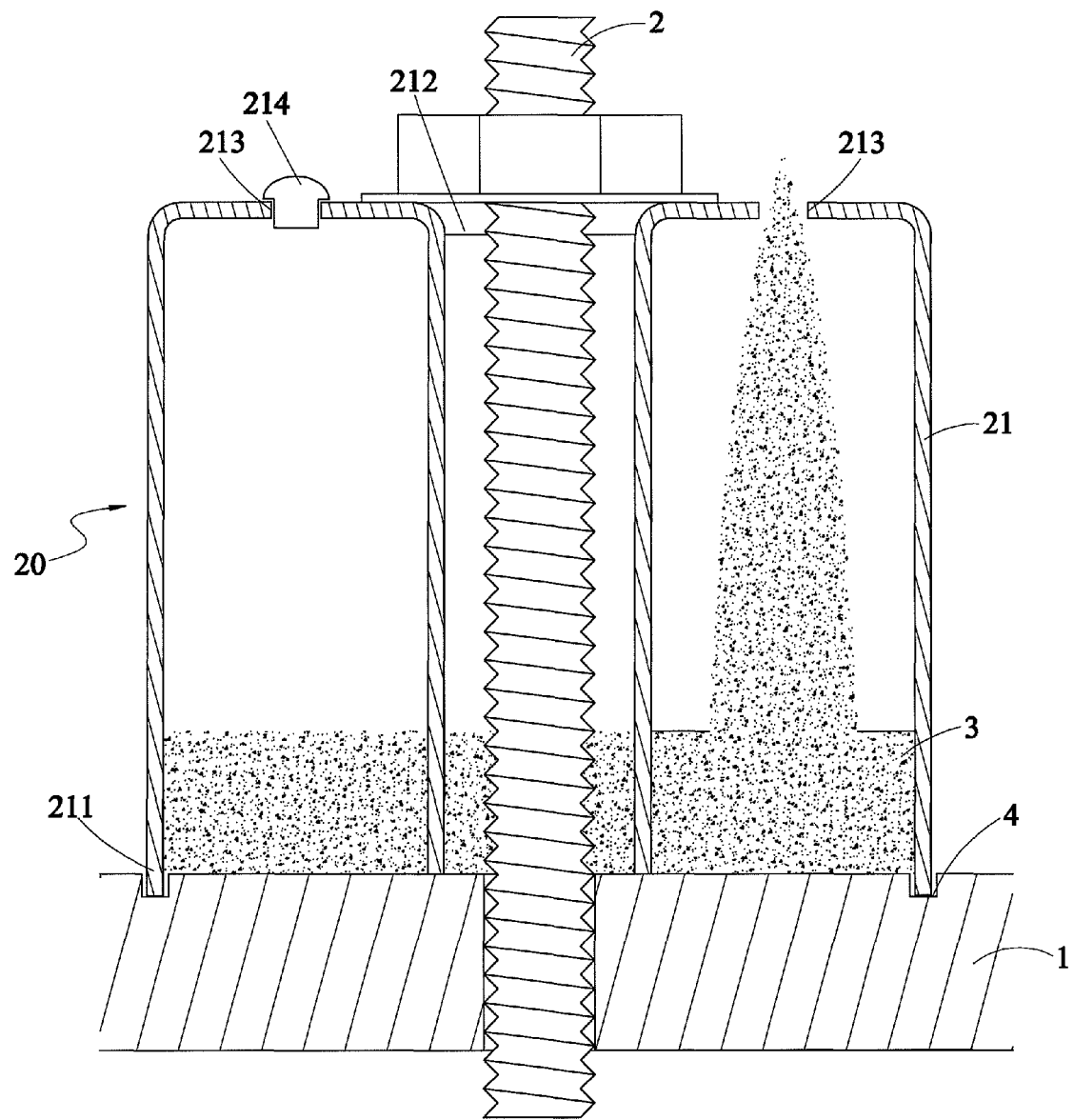

Referring to FIGS. 5A and 5B, the water leakage-proof apparatus 20 comprises a casing 21 with an orifice 212 formed thereon and an opening 211 at one side. The water leakage-proof apparatus 20 is coupled on a shaft 2 through the orifice 212 and allows the opening 211 to cover the fixed surface 1. The casing 21 is formed as a wall of the orifice 212 and extended to the opening 211 to provide support effect. The casing 21 further has at least one powder injection hole 213 covered by a sealing element 214. After the water leakage-proof apparatus 20 is coupled on the shaft 2, the waterproof powder 3 can be injected directly through the orifice 212 to protect the shaft 2; next, anchor the water leakage-proof apparatus 20 on the fixed surface 1 through a fastening element 5; then fill the waterproof powder 3 into the water leakage-proof apparatus 20 through the powder injection hole 213 so that the area around the shaft 2 and the area covered by the water leakage-proof apparatus 20 forms a waterproof layer; finally, cover the sealing element 214 on the powder injection hole 213.

Compared with the conventional techniques that apply waterproof sealant or are sealed by external washers cannot fully prevent water from permeating or leaking, the water leakage-proof apparatus of the invention can securely cover the waterproof powder on the shaft and the fixed surface to achieve desired water leakage-proof effect.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A water leakage-proof apparatus coupled on a shaft perpendicular to a fixed surface, comprising:
    a casing which includes an orifice and an opening at one side, and a powder holding chamber inside opposing the opening; and
    at least one movable isolating structure located between the powder holding chamber and the opening to hold and retain waterproof powder in the powder holding chamber;
    wherein the water leakage-proof apparatus is coupled on the shaft through the orifice such that the opening covers the fixed surface; the movable isolating structure being opened to allow the waterproof powder to drop and cover on the fixed surface from the powder holding chamber, wherein the powder holding chamber is divided by a plurality of partitions, each divided powder holding chamber is corresponding to one movable isolating structure.

2. The water leakage-proof apparatus of claim 1, wherein the movable isolating structure includes a plurality of isolating plates each including a latch portion corresponding to a latch element, the isolating plates being securely fastened the latch portion through the latch element to retain the waterproof powder in the powder holding chamber.

3. The water leakage-proof apparatus of claim 1, wherein the water leakage-proof apparatus includes a plurality of powder release holes communicating with the powder holding chamber on a wall of the casing, and the powder release holes are blocked by a sleeve.

4. The water leakage-proof apparatus of claim 1, wherein the opening is formed at a minimum size of four times or more of the diameter of the shaft.

5. The water leakage-proof apparatus of claim 1, wherein the casing includes a window to observe laying conditions of the waterproof powder.

6. The water leakage-proof apparatus of claim 1, wherein the casing is made of metal.

* * * * *